(12) United States Patent
Ory

(10) Patent No.: US 8,888,125 B2
(45) Date of Patent: Nov. 18, 2014

(54) INFLATABLE AIRBAG ARRANGEMENT COMPRISING A FLAP CONNECTED TO AN INSTRUMENT PANEL BY A LINEAR LINK HAVING FOUR PARALLEL RETAINING PORTIONS

(75) Inventor: Daniel Ory, Le Plessis-Bouchard (FR)

(73) Assignee: Faurecia Interieur Industrie, Nanterre (FR)

( * ) Notice: Subject to any disclaimer, the term of this patent is extended or adjusted under 35 U.S.C. 154(b) by 112 days.

(21) Appl. No.: 13/812,466

(22) PCT Filed: Jul. 25, 2011

(86) PCT No.: PCT/EP2011/062730
§ 371 (c)(1),
(2), (4) Date: May 15, 2013

(87) PCT Pub. No.: WO2012/013628
PCT Pub. Date: Feb. 2, 2012

(65) Prior Publication Data
US 2014/0291970 A1    Oct. 2, 2014

(30) Foreign Application Priority Data
Jul. 26, 2010    (FR) ...................................... 10 56119

(51) Int. Cl.
*B60R 21/216*    (2011.01)
*B60R 21/215*    (2011.01)
(52) U.S. Cl.
CPC .................................... *B60R 21/215* (2013.01)
USPC ..................................... 280/728.3; 280/743.2
(58) Field of Classification Search
USPC .................................. 280/728.3, 743.2, 732
See application file for complete search history.

(56) References Cited

U.S. PATENT DOCUMENTS

| | | |
|---|---|---|
| 5,306,042 A | 4/1994 | Frank |
| 6,338,501 B1 * | 1/2002 | Heilig et al. ................... 280/753 |
| 8,376,395 B2 * | 2/2013 | Ory ............................ 280/728.3 |
| 8,657,328 B2 * | 2/2014 | Ory ............................ 280/728.3 |
| 2007/0080521 A1 * | 4/2007 | Leserre et al. ............. 280/728.3 |
| 2011/0181028 A1 * | 7/2011 | Brunet ....................... 280/728.3 |
| 2011/0278827 A1 * | 11/2011 | Laboeck et al. ........... 280/743.2 |
| 2012/0280476 A1 | 11/2012 | Ory |

FOREIGN PATENT DOCUMENTS

| | | |
|---|---|---|
| DE | 10325932 | 1/2005 |
| FR | 2941194 | 7/2010 |
| JP | 8192706 | 7/1996 |
| JP | 10291454 | 11/1998 |

OTHER PUBLICATIONS

International Search Report for PCT/EP2011/062730 dated Oct. 12, 2011, 2 pages.

* cited by examiner

*Primary Examiner* — Drew Brown
(74) *Attorney, Agent, or Firm* — Reising Ethington P.C.

(57) ABSTRACT

The invention relates to an inflatable airbag arrangement comprising a dashboard body presenting a window, a flap closing the window and being hinged to a transverse hinge edge of the window, and a firing channel fastened to the bottom face of the dashboard body. At least one tie is fastened to the flap and to the firing channel in order to form a hinge and/or in order to limit opening of the flap, and the firing channel includes at least one opening putting an inside face of an edge of the firing channel into communication with an outside face thereof. The tie passes through the opening in order to be fastened by being retained firmly by an outside face of the firing channel while the flap is opening.

10 Claims, 2 Drawing Sheets

INFLATABLE AIRBAG ARRANGEMENT COMPRISING A FLAP CONNECTED TO AN INSTRUMENT PANEL BY A LINEAR LINK HAVING FOUR PARALLEL RETAINING PORTIONS

The invention relates to arranging an inflatable airbag in a motor vehicle dashboard body, the airbag being positioned, for example, so as to provide frontal protection for an occupant of the vehicle seated beside the driver of the vehicle.

BACKGROUND OF THE INVENTION

With such an arrangement, the dashboard body is provided with a window that is closed in its top face by a flap, and it is also provided with a firing channel that is fastened to the bottom face of the dashboard body while also surrounding the window.

The firing channel presents a top face that matches the convex shape of the dashboard body, and a bottom face that is generally plane and to which a standard type of airbag module is fastened.

When the airbag inflates, it passes through the firing channel so as to bear against the bottom face of the flap, thereby causing the flap to open. The airbag then passes through the window of the dashboard body so as to be deployed into the vehicle cabin for the purpose of protecting the occupants therein.

In general, the window is rectangular in outline and the flap is hinged about the transverse edge of the window that is closer to the front in the forward direction of the vehicle, i.e. the transverse edge that is closer to the windshield.

Given the speed with which the flap opens, it can strike against the windshield while it is opening as a result of the airbag inflating. This can give rise to flap debris being projected towards the occupants of the vehicle, and that might injure them.

In order to remedy that drawback, document U.S. Pat. No. 6,390,497 teaches that it is known to provide two lateral ties, each securing a respective side edge of the flap to a corresponding side edge of the window, those ties being slack while the flap is closed. The opening of the flap is then limited by the lateral retaining ties, which become tensioned as the airbag inflates so that the flap cannot strike the windshield.

The forces that arise during opening are large because it is desirable for the airbag to deploy rapidly, and as a result the mechanical strength of the retaining ties is generally not sufficient. In practice, the ties tend to be torn out from the dashboard body, thereby damaging the flap and as a result running the risk of projecting debris towards the occupants of the vehicle.

OBJECT OF THE INVENTION

An object of the invention is to propose a solution for remedying those drawbacks.

SUMMARY OF THE INVENTION

To this end, the invention provides in one embodiment an inflatable airbag arrangement for a motor vehicle dashboard, the dashboard comprising a dashboard body presenting a window for passing an inflatable airbag, a flap closing the window while being hinged to a transverse hinge edge of the window, and a firing channel fastened to the bottom face of the dashboard body and forming a frame surrounding the window, the firing channel presenting a bottom face that is plane for receiving an inflatable airbag module, wherein the arrangement comprises at least one tie secured to the flap and to the firing channel in order to constitute at least four distinct retaining portions, each retaining portion being secured firstly to the flap and secondly to the firing channel in zones that are distinct from the other portions and serving to limit the opening of the flap, the four distinct retaining portions extending substantially parallel to one another when the flap is open, wherein the firing channel includes openings oriented radially relative to the window in order to put an inside face of an edge of the firing channel into communication with an outside face thereof, and wherein said at least one tie passes radially through at least one opening in order to be retained firmly by an outside face of the firing channel while the flap is opening as a result of the airbag inflating.

The presence of four distinct retaining tie portions halves the tension forces to which each of the tie portions is subjected, and the tie portions are secured directly to the firing channel, which is stronger than the remainder of the dashboard body.

As a result, the risk of the tie portions breaking is significantly reduced, and likewise the risk of these retaining portions being torn out is also reduced.

Also provided is an arrangement as defined above, wherein the firing channel has openings in the form of slots in its side edges, each opening having a throat opening out into the top face of the firing channel and an opening body connected to the throat and presenting dimensions greater than the dimensions of the throat, the opening body being offset relative to the throat towards the hinge edge of the flap, and wherein said at least one tie secured to the flap presents a portion that passes radially through at least one slot in order to be retained firmly by the outside face of the firing channel.

The openings of notch or slot shape opening out into a top or bottom face of the firing channel make it easier to put the tie into place and in particular they make it possible to use a tie that forms a closed loop.

Also provided is an arrangement as defined above, wherein the firing channel has a side edge provided with two openings in the form of slots, and wherein the tie locally constitutes a loop passing radially through the firing channel via these two slots and being retained by the portion of the outside face of the firing channel that is situated between the two slots.

Thus, two retaining portions situated on the same side of the flap are connected to each other by the loop passing through the side edge of the firing channel, thus enabling the tension forces in these two tie portions to be balanced, thereby further limiting any risk of the tie breaking when the flap opens.

Also provided is an arrangement as defined above, wherein the firing channel has an edge running along the hinge edge of the flap, this edge also being provided with one or more openings in the form of notches opening out into the bottom face of the firing channel, and including at least one tie secured to the flap and passing radially through the notch, being retained by the outside face of the firing channel in order to constitute a hinge of the flap on the dashboard body.

Also provided is an arrangement as defined above, wherein the edge of the firing channel running along the hinge edge of the flap has at least two notches and a tie locally forming a loop passing radially through the firing channel via two notches, and being retained by the portion of the outside face of the firing channel that is situated between those two notches in order to constitute a hinge of the flap on the dashboard body.

DETAILED DESCRIPTION OF THE INVENTION

Referring to the figures, there is shown an airbag flap arrangement that uses four distinct retaining tie portions, each of which is fastened to the flap and to the body of the dashboard in order to limit the opening of the flap in distinct zones of the other portions, while taking advantage of the firing channel to constitute secure anchors for these retaining tie portions in the body of the dashboard.

Figure 1:
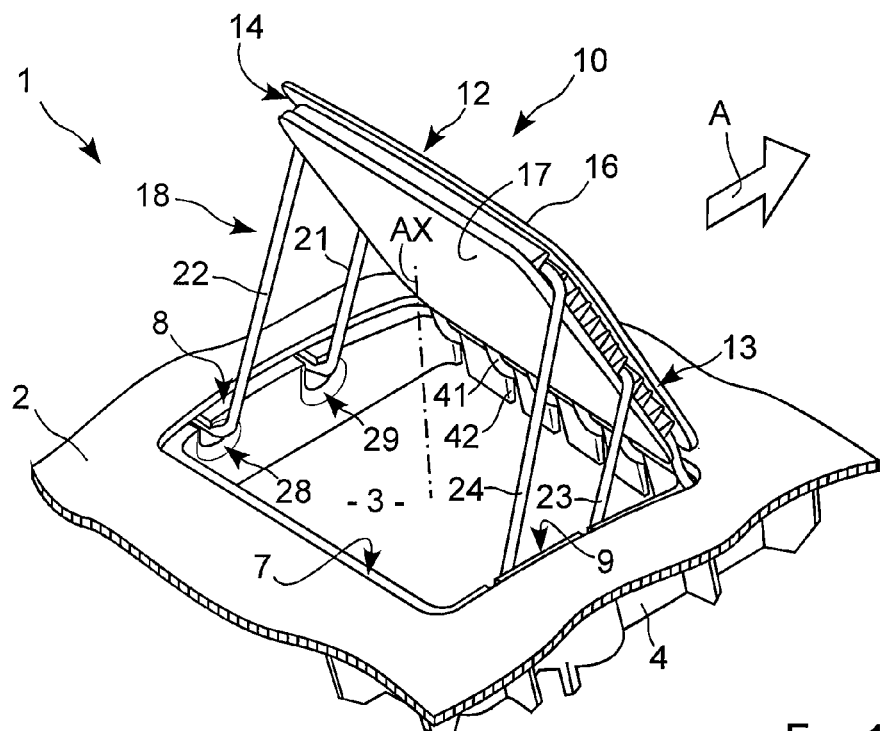
FIG. 1 is a perspective view showing the arrangement of the invention when the flap is open.
Figure 2:
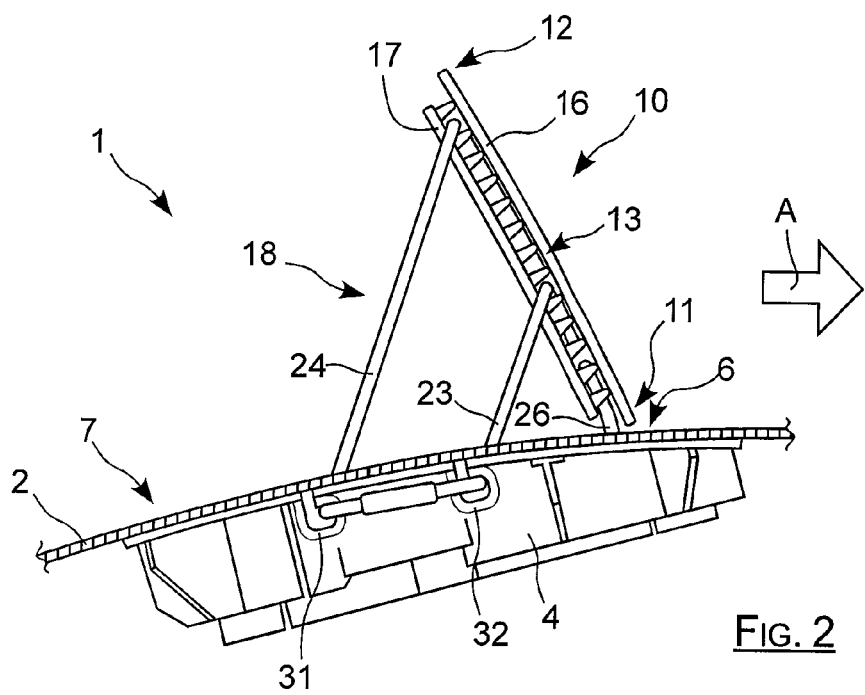
FIG. 2 is a side view of the arrangement of the invention when the flap is open.

The four retaining tie portions are arranged to extend more or less parallel to one another when they are under tension, i.e. when the flap is opened, so as to ensure that tension forces are distributed in uniform manner among the various portions while the flap is opening. As can be seen in FIGS. 1 and 2, the tie portions are distinct from one another when they are under tension. The anchors of these retaining tie portions are thus spaced apart from one another.

As can be seen in FIG. 1, the illustrated embodiment, given overall reference 1, is incorporated in a dashboard comprising a dashboard body, given overall reference 2, that presents a rectangular window 3 through which an airbag (not shown) passes.

A firing channel, given overall reference 4, presents an internal outline that is also generally rectangular and is fastened to the bottom face of the body of the dashboard 2 so as to surround the window 3. The firing channel also presents a top face that matches the convex shape of the body of the dashboard, and a bottom face that is generally plane and that has an airbag module fastened thereto. The firing channel is consequently a part that is separate from the airbag module, of generally rectangular shape.

The window 3 and the firing channel 4 act together to define a rectangular outline having a front transverse edge 6 that is in front in the forward direction A of the vehicle, and a rear transverse edge 7 opposite from the front edge 6. The two side edges of the outline are referenced 8 and 9 and they extend more or less parallel to the direction A.

The window 3 is closed by a flap 10 which is also rectangular, having a front transverse edge 11, a rear transverse edge 12, and two side edges 13 and 14. The front transverse edge 11 of the flap is hinged to the front transverse edge 6 of the window, so as to open when the airbag is inflated.

As can be seen in the figures, the flap 10 has a wall 16 that extends the dashboard body 2 when the flap is closed, and a plate 17 that is fastened to the bottom face of said wall 16.

The plate 17 presents a bottom face that is substantially plane, while on the contrary it presents a top face having a series of transverse and longitudinal ribs that project therefrom. The plate 17 is fastened to the wall 16 e.g. by vibration welding or the like, so it is the projecting edge faces of the ribs that are secured to the bottom face of the wall 16.

There thus exists a space between the generally plane body of the plate 17 and the bottom face of the wall 16, this space being defined by the various transverse and longitudinal ribs that thus form channels situated between the body of the plate 17 and the wall 16.

As can be seen in the figure, a linear tie given overall reference 18 is fastened to the flap 10 and to the dashboard body 2. The tie has two lateral retaining portions 21 and 22 that connect together the side edges 9 to 13, and two other lateral portions 23 and 24 that connect together the side edges 8 to 14 in order to limit opening of the flap 10.

The retaining tie portions 21 and 23 are those that are closer to the front transverse edges or hinge edges referenced 6 and 11. The retaining portions 22 and 24 are those that are closer to the rear transverse edges 7 and 12 constituting the opening edges of the flap. Each retaining portion has one end fastened to the flap and its other end fastened or secured to the firing channel that is fitted to the dashboard body.

In addition, the tie 18 also has a hinge portion 26 that passes through the transverse edges 6 and 11 of the window 3 and of the flap 10 in order to constitute or to reinforce the hinge connecting the flap 10 to the remainder of the dashboard.

The tie 18 is fastened to the flap 10 by being engaged between the transverse ribs of the plate 17 so that it is thus held captive between the body of the plate 17 and the wall 16 while being retained by the ribs between those two elements, these ribs advantageously being of shapes and dimensions that are suitable for firmly retaining the tie.

In the example in the figures, the tie 18 extends from the lateral portion 22 to the lateral portion 24 by being engaged in a groove defined by two transverse ribs of the plate 17. The two lateral portions 21 and 23 are likewise engaged between consecutive ribs of the plate 17, and between the plate 17 and the wall 16 they follow paths leading to the hinge edge 11 of the flap in order to constitute hinge portions 26 of the tie 18.

As can be seen in the figures, the side edge 8 of the firing channel 4 has two openings 28 and 29 passing through the edge 8 radially relative to an axis AX normal to the window 3 and centered on the window. Each opening 28, 29 is a slot that passes radially through the edge 8 of the firing channel 4 so as to put an inside face of the edge 8 of the firing channel 4 into communication with an outside face thereof, and that also opens out into the top face of the firing channel, i.e. the face whereby the firing channel is fastened to the bottom face of the dashboard body 2.

The retaining portions 21 and 22 of the tie 18 are fastened to the side edge 8 of the firing channel 4 by being engaged respectively in the slot 29 and in the slot 28, the tie locally constituting a loop that passes through the edge 8. The portion of this loop that unites the portions 21 and 22 thus bears against the portion of the outside face of the edge 8 of the channel 4 that is situated between the two slots 28 and 29.

In analogous manner, the retaining portions 23 and 24 of the tie 18 that connect together the side edges 13 and 9 are fastened to the dashboard by being engaged in two other slots 32 and 31 that pass radially through the edge 9 of the firing channel so as to put the inside face of that edge into communication with its outside edge while also opening out into the top face of the firing channel 4.

Figure 3:
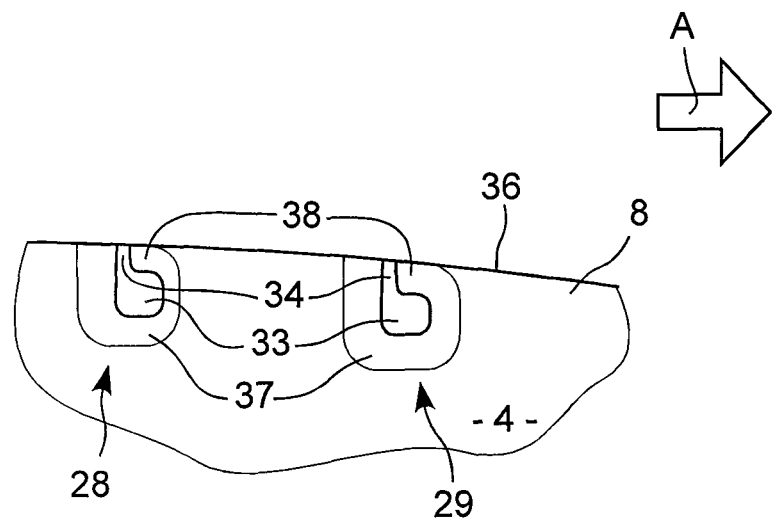
FIG. 3 is a detail view showing the slots of the arrangement of the invention without ties.

As can be seen more clearly in FIG. 3, each slot 28, 29 comprises firstly a body having an opening 33 of dimensions that are greater than the diameter of the tie 18, and a throat 34 of dimensions that are very close to the diameter of the tie 18, through which the slot 28 opens out into the top face 36 of the firing channel 4.

Figure 4:
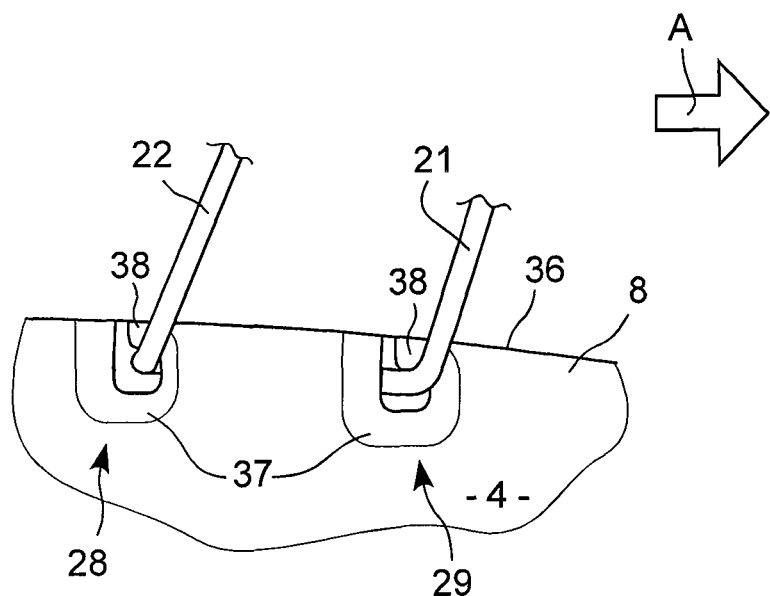
FIG. 4 is a detail view showing the slots of the arrangement of the invention when they have portions of ties passing through them that have been put under tension by opening the flap.

As can be seen in the figures, in each of the slots 28 and 29, the main opening 33 is offset towards the front of the vehicle, i.e. towards the hinge edge 6, relative to the throat 34. This offset makes it possible to define a hook- or spur-forming projection 38 in the top portion of each slot that faces away from the transverse edge 6, i.e. opposite to the direction A. Each projection 38 is made of the rigid material of the firing channel 4, and the tie 18 bears against each projection when the flap 10 opens, this situation being shown in FIG. 4.

In addition, the inside and outside edges of the slots 28 and 29 are rounded. Each of these edges 37 that corresponds to the inside surface defined by the slot joining the inside or outside surface of the edge 8 of the firing channel 4 is rounded so as to present a radius of curvature of the same order as the radius or the diameter of the linear tie, instead of having a sharp-edged profile as would otherwise be the case.

Under such conditions, when the retaining portions 21-24 of the tie 18 are put suddenly under tension as a result of the flap opening, the risk of the tie 18 rupturing in the slots is more or less eliminated because the tie then bears against a curved surface referenced 37 in the figures.

As can be understood, the slots 31 and 32 of the edge 9 of the firing channel 4 that receive the lateral portions 23 and 24 of the retaining tie have the same shapes and arrangements as the slots 28 and 29, and they present the same advantages.

The slots in which the retaining portions of the tie 18 are engaged are made in the material of the firing channel 4, which presents greater mechanical strength than the dashboard body 2, so that the slots hold the tie 18 firmly while the flap 10 is opening, without running the risk of being torn open.

Because these slots 28, 29, 31, 32 open out into the top face of the firing channel 4, it is easier to engage the retaining tie portions 21, 22, 23, and 24: the two loops that are formed locally firstly by the portions 21 and 22 and secondly by the portions 23 and 24 can be engaged through the top face 26 of the firing channel before the channel 4 is assembled with the bottom face of the dashboard body, thereby simplifying the fabrication process. Thus clearly, once the firing channel has been assembled to the dashboard, no further action is required on the tie. The tie is not connected to the airbag module. All that remains to be done is to place the airbag module against the bottom face of the channel in order to finish off the arrangement.

Having slots that present throats 34 of dimensions that are significantly smaller than the diameter of the tie 18 ensures that once the tie 18 has been engaged in these openings there is no risk of it separating therefrom in untimely manner.

As mentioned above, in the example shown in the figures, the tie 18 also includes a hinge portion 26 constituted by a series of loops projecting from the hinge edge 11 of the flap 10 and regularly spaced apart from one another.

The strands of these loops are shown in FIG. 1 where they are referenced 41, and each of them is engaged in a corresponding notch, these notches being referenced 42. Each notch 42 is made in the front edge 6 of the firing channel 4 and it is generally straight in shape extending vertically and opening out into the plane bottom face of the firing channel 4.

When the assembly is put into place, as in FIG. 1, each loop of the hinge portion 26 of the tie 18 surrounds a portion of the front edge 6 of the firing channel so as to bear against the portion of the outside face of the channel that lies between two separate notches.

As with the lateral tie portions, the notches serve to retain the tie 18 firmly so that the flap opens without any risk of being torn off or of being destroyed.

In the example shown in the figures, the notches 42 opening out into the bottom face of the firing channel are generally straight. These notches could equally well have shapes of the same type as the slots 28 and 29, having an opening body of large dimensions connected to a throat of dimensions close to or significantly smaller than the diameter of the tie, the throat opening out into the bottom face of the firing channel.

Under such conditions, the openings 42 serve to hold each strand 41, which is then retained vertically by the throat, thereby preventing it from moving downwards under the effect of its own weight and preventing it from thereby leaving the opening.

The flap 10 with its lateral tie portions and its hinge portions is advantageously installed before fastening the firing channel to the dashboard body 2. By way of example, the tie 18 is put into place over the top face of the plate 17 between the ribs provided for this purpose so as to constitute firstly the loops that project from the side edges in order to form the tie portions that retain the flap, and secondly the loops that project from the hinge edge of the flap in order to form the hinge of the flap.

Advantageously, the ribs of the top face of the plate 17 are close enough to one another to serve to hold the tie temporarily, merely by being engaged between the ribs.

The plate 17 is then presented via the bottom face of the firing channel so as to engage the loops of the tie 18 that form the hinge portion 26 of the tie in the corresponding notches of the front edge 6 of the firing channel 4.

Once this operation has been completed, the flap can be held in the open position above the opening 3 in order to pass the lateral loops of the tie into the slots of the side edges of the firing channel. The lateral loops may then be pulled outwards so as to retrieve the additional lengths of these loops and place them outside the firing channel so that they do not risk disturbing the opening of the flap. During this operation, the flap spontaneously takes up its closed position.

The firing channel with the plate 17 can then be pressed against the bottom face of the dashboard body 2 in order to be fastened thereto, e.g. using a vibration welding method, or any other suitable method.

It should be observed that in the example shown in the figures, a tie 18 is used that is generally constituted by a single closed loop, that is arranged so as to constitute the lateral loops on which the four retaining ties 21-24 are based, and a plurality of loops along the hinge edge.

The invention applies equally well to a solution in which the tie is not necessarily a closed loop, and to circumstances in which a plurality of ties are used in order to define the various retaining and/or hinge portions.

What is claimed is:

1. An inflatable airbag arrangement for a motor vehicle dashboard, the dashboard comprising a dashboard body presenting a window for passing an inflatable airbag, a flap closing the window while being hinged to a transverse hinge edge of the window, and a firing channel fastened to the bottom face of the dashboard body and forming a frame surrounding the window, the firing channel presenting a bottom face that is plane for receiving an inflatable airbag module, wherein the arrangement comprises at least one tie secured to the flap and to the firing channel in order to constitute at least four distinct retaining portions, each retaining portion being secured firstly to the flap and secondly to the firing channel in zones that are distinct from the other portions and serving to limit the opening of the flap, the four distinct retaining portions extending substantially parallel to one another when the flap is open, wherein the firing channel includes openings oriented radially relative to the window in order to put an inside face of an edge of the firing channel into communication with an outside face thereof, and wherein said at least one tie passes radially through at least one opening in order to be retained firmly by an outside face of the firing channel while the flap is opening as a result of the airbag inflating.

2. An arrangement according to claim 1, wherein the firing channel has openings in the form of slots in its side edges, each opening having a throat opening out into the top face of the firing channel and an opening body connected to the throat and presenting dimensions greater than the dimensions of the throat, the opening body being offset relative to the throat towards the hinge edge of the flap, and wherein said at least one tie secured to the flap presents a portion that passes radially through at least one slot in order to be retained firmly by the outside face of the firing channel.

3. An arrangement according to claim 2, wherein the throat of each of the slot-forming openings presents dimensions that are substantially less than the diameter of the tie.

4. An arrangement according to claim 2, wherein the firing channel has a side edge provided with two openings in the form of slots, and wherein the tie locally constitutes a loop passing radially through the firing channel via these two slots and being retained by the portion of the outside face of the firing channel that is situated between the two slots.

5. An arrangement according to claim 1, wherein the firing channel has an edge running along the hinge edge of the flap, this edge also being provided with one or more openings in the form of notches opening out into the bottom face of the firing channel, and including at least one tie secured to the flap and passing radially through the notch, being retained by the outside face of the firing channel in order to constitute a hinge of the flap on the dashboard body.

6. An arrangement according to claim 5, wherein the notches have shapes of the same type as the slots.

7. An arrangement according to claim 6, wherein the throat of each notch in the form of a slot presents dimensions that are significantly smaller than the diameter of the tie.

8. An arrangement according to claim 5, wherein the edge of the firing channel running along the hinge edge of the flap has at least two notches and a tie locally forming a loop passing radially through the firing channel via two notches, and being retained by the portion of the outside face of the firing channel that is situated between those two notches in order to constitute a hinge of the flap on the dashboard body.

9. An arrangement according to claim 1, wherein the tie is constituted by a single closed loop.

10. A motor vehicle including an inflatable airbag arrangement for a dashboard according to claim 1.

* * * * *